United States Patent
Clark et al.

(10) Patent No.: US 8,390,810 B2
(45) Date of Patent: Mar. 5, 2013

(54) COLOR SENSING DEVICE

(75) Inventors: Stephan R. Clark, Corvallis, OR (US); Brett E. Dahlgren, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 266 days.

(21) Appl. No.: 12/746,464

(22) PCT Filed: Dec. 20, 2007

(86) PCT No.: PCT/US2007/026183
§ 371 (c)(1),
(2), (4) Date: Jun. 4, 2010

(87) PCT Pub. No.: WO2009/082371
PCT Pub. Date: Jul. 2, 2009

(65) Prior Publication Data
US 2010/0259755 A1    Oct. 14, 2010

(51) Int. Cl.
*G01J 3/46* (2006.01)
(52) U.S. Cl. ...................................................... 356/402
(58) Field of Classification Search ........... 356/402–425
See application file for complete search history.

(56) References Cited

U.S. PATENT DOCUMENTS

| | | | |
|---|---|---|---|
| 3,999,864 A | 12/1976 | Mutter | |
| 4,096,217 A | 6/1978 | Roll | |
| 4,123,172 A | 10/1978 | French | |
| 4,310,249 A * | 1/1982 | Kramer | 356/414 |
| 4,892,409 A * | 1/1990 | Smith | 356/414 |
| 5,272,518 A * | 12/1993 | Vincent | 356/405 |
| 5,340,974 A * | 8/1994 | Zalewski | 250/205 |
| 6,147,761 A * | 11/2000 | Walowit et al. | 356/425 |
| 6,523,920 B2 | 2/2003 | Wade et al. | |
| 6,590,660 B2 * | 7/2003 | Jung et al. | 356/419 |
| 6,621,576 B2 | 9/2003 | Tandon et al. | |
| 6,947,143 B2 | 9/2005 | Kritchman et al. | |
| 7,034,942 B2 | 4/2006 | Gudaitis et al. | |
| 2006/0215162 A1 * | 9/2006 | Shannon et al. | 356/419 |

FOREIGN PATENT DOCUMENTS

KR    10-2007-0092577 A    9/2003

OTHER PUBLICATIONS

Encyclopedia of Laser Physics and Technology, Integrating Spheres, available at http://www.rp-photonics.com/integrating_spheres.html.*

International Search Report and the Written Opinion of the International Searching Authority. Mail Date Sep. 16, 2008. International Application No. PCT/US2007026183. International Filing Date Dec. 20, 2007.

* cited by examiner

*Primary Examiner* — Gregory Toatley
*Assistant Examiner* — Dominic J Bologna

(57) ABSTRACT

A color sensing apparatus (10) includes an optical system (16) that produces a spatially uniform light beam (18).

4 Claims, 1 Drawing Sheet

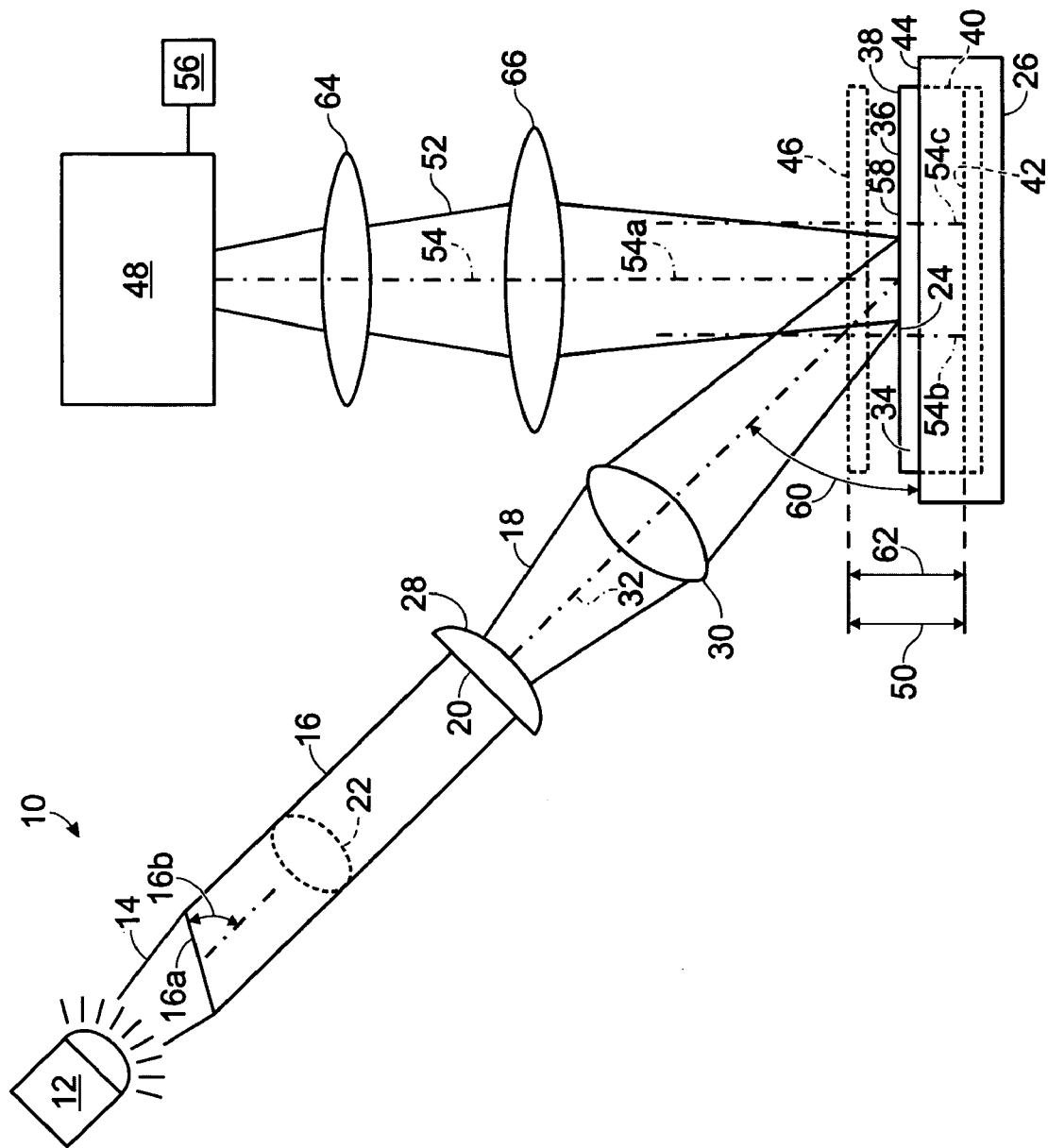

COLOR SENSING DEVICE

BACKGROUND

Color sensing devices may include a light source that projects a light beam to a color sample to be measured and a sensor that detects the light reflected by the sample to determine if a correct color was printed on the sample. However, if the sample is not accurately positioned the sensor may detect an inaccurate color reading because a light intensity of the light reflected by the sample may vary depending on the sample's position. Accordingly, it may be desirable to provide a color measurement device that reduces inaccurate color measurement readings.

BRIEF DESCRIPTION OF THE DRAWINGS

FIG. 1 is a schematic side view of one example embodiment of a color sensing device.

DETAILED DESCRIPTION OF THE DRAWINGS

FIG. 1 is a schematic side view of one example embodiment of a color sensing device 10. Device 10 may include a light source 12 that projects a source light beam 14 to an optical element 16. Light source 12 may be any type of light source such as an incandescent light bulb, a light emitting diode (LED) or the like, for example. Accordingly, source light beam 14 may be white light, or a particular range of light wavelengths, for example.

Optical element 16 receives source light beam 14 and produces an output light beam 18. Source light beam 14 is spatially scrambled as it propagates to an object plane 20, i.e., an exit plane, of optical element 16. Spatially scrambled means adjusting the relative positions of rays emitted from the light source 12 and repositioning them onto other sections of a secondary image plane such as object plane 20, thus the rays of output light beam 18 coming from the secondary source, object plane 20, are not correlated to the initial light source 12 that created them. Stated another way, one definition of a spatially uniform light beam may be that "each point of an exit face of a light tunnel has some content of light rays from all or most points of an input light source distribution." Thus optical element 16 may also be described as a light integrator 16 that produces a scrambled, rearranged, randomized, or integrated, output light beam 18.

Optical element 16 can alter the power distribution of light beam 14 at object plane 20. Adjusting the power distribution at object plane 20 can off set power distribution changes that occur when looking at the power distribution on a tilted media plane 38, such as defined by a sheet of print media 34 supported on a media support 26, which may be positioned at an acute angle 60 with respect to an axis 32 of output light beam 18. Because the image of object plane 20 is not parallel to media plane 38 in device 10, without any correction as is supplied by device 10, the power distribution will tend to have a non-spatially uniform distribution near media plane 38. Accordingly, a tapered inlet surface 16a, on the front end of optical element 16 may adjust the power distribution to create the spatially uniform beam 18 only in the region around media plane 38. Thus, tapered inlet surface 16a, in conjunction with optical element 16 may create the spatially uniform beam 18 in the region of media plane 38.

Tapered inlet surface 16a acts to re-apportion the spatial distribution of the light source 12 on object surface plane 20 of optical element 16. Thus the angled surface 16a directs the light beam 14 by refraction with an angular deviation that is set by the angle of the input light to the angle of tapered surface 16a. When source light beam 14 has multiple angles of light that comprise it, each light angle will refract differently. This allows a preferential redistribution of light beam 14 as the multiple angles of light propagate down optical element 16. The angle of tapered inlet surface 16a is set by the length of element 16 as well as the amount of re-apportioning that is needed to get the desired power distribution on the media plane 38. Tapered inlet surface 16a may also have only a portion of its surface angled while the other portion may be flat or define a surface normal to the beam axis 32 of source 12. This may allow some greater selectivity of where the light of source light beam 14 gets re-apportioned on object surface 20 of optical element 16.

Optical element 16 may be a hollow tube with a beam steering element in front of it such as a wedge that defines a tapered front surface 16a, or a solid elongate member with a tapered inlet surface 16a, for example, manufactured of a material having an index of refraction greater than an index of refraction of air, such as a solid elongate member manufactured of glass. In embodiments wherein the axis 32 of output light beam 18 and the axis 54 of color sensor 48 are substantially parallel, a tapered inlet surface 16a on optical element 16 may not be utilized.

A spatially uniform light beam is not the same as a collimated light beam, which may be defined as a light beam in which the nominal ray directions in the beam are parallel. Beam uniformity at a given plane is decoupled from the angular extent of the beam. Thus, at any given point in space a beam may have spatial uniformity, meaning that there is approximately constant power as a function of position, but may be made up of light rays at many different angles. The amount of beam collimation is not a sufficient condition for defining beam spatial uniformity. Stated another way, a light beam having a spatially uniform distribution of light intensity may include non-collimated light at different angles that are overlaid on one another to define an even or a constant intensity across the light beam exit, such as across an object plane Optical element 16 may define a cross sectional shape 22 (shown in perspective view as dash lines for ease of illustration) that may define the shape of a light spot 24 output from the object plane 20 of optical element 16 and projected to a print media support 26. For example, optical element 16 may define a square, rectangular, trapezoidal, or circular cross sectional shape 22, for example, and may therefore define a corresponding square, rectangular, trapezoidal, or circular cross sectional shape of light spot 24.

Optical element 16 may include a first field lens 28 secured to optical plane 20, i.e., secured to the end 20, of optical element 16. In one embodiment first field lens 28 may be glued to optical plane 20 of optical element 16. A second lens 30 may be positioned between first field lens 28 and print media support 26, along an output source light beam axis 32, that extends from optical element 16 to print media support 26. First and second lenses 28 and 30, and any other lenses or optical devices positioned along output light beam axis 32, may project output light beam 18, projected from optical plane 20 of optical element 16, to print media support 26 without allowing output light beam envelope 18 to converge or diverge after passing through lens 30. In other words, field lens 28 and lens 30 project a non-diverging and non-converging output light beam 18 to print media support 26, without changing the bounds of the projected output light beam 18 from the path from lens 30 to the media plane 38. Thus by design of lenses 28 and 30 and the optical element 16 incorporating tapered inlet surface 16a, the beam spatial uniformity and approximately constant power envelope of beam 18 can be achieved in the region near media plane 38. Tapered inlet surface 16a of optical element 16 may define an angle 16b of taper dependent upon angle 60 between axis 32 and media plane 38 of sheet of print media 34 so as to provide spatial uniformity of output light beam 18 in the region of anticipated reflection region 58.

Print media support 26 may support thereon a sheet of print media 34. Device 10 may be utilized to determine whether a printed color region 36 (shown in end view) printed on print media 34 is of a desired color quality. In other words, device 10 may be used to sense the color of printed color region 36 to determine if a color printing device, which may be a component of device 10, is working satisfactorily. In one example, printed color region 36 may be a large area of printed red ink on a top surface 38 of print media 34.

Print media support 26 may include downwardly extending ribs 40 that may allow portions of print media 34 to bend or cockle downwardly therein such that top surface 38 of sheet of print media 34 may be positioned at a low position 42 (shown in dash lines) below a top surface 44 of print media support 26. In another embodiment, such as when measuring a different sheet of print media 34, the sheet of print media 34 may bend or cockle upwardly from print media support 26 such that top surface 38 of sheet of print media 34 may be positioned at a high position 46 (shown in dash lines) above top surface 44 of print media support 26.

During operation, output light beam 18 is projected to sheet of print media 34 and a portion of output light beam 18 is reflected therefrom as reflected light 52 along a reflected light axis 54. The portion of output light beam 18 that is reflected as reflected light 52 may be determined by the color of printed color region 36 on sheet of print media 34. Accordingly, a color sensor 48, which may include or be connected to a controller 56, may accurately determine the color of printed color region 36 by an analysis of reflected light 52, and in particular, by an analysis of the light intensity of reflected light 52.

During color measurements, if the power per measured area (of light 52 reflected from printed color region 36) changes as the sample is shifted in position, there will be a perceived change in brightness of the sample even though the test sample did not change it reflectance. In prior art devices, the measured light intensity of reflected light may vary greatly depending on the position of a sheet of print media on its support. Such inaccurate light intensity measurements may be due to the use of a non-spatially uniform output light beam, and/or due to the use of either a converging or a diverging output light beam. For example, if a sheet of print media is cockled upwardly or downwardly a distance of even 0.25 millimeters (mm) from its support, wherein the support may define an anticipated position of the sheet of print media, then the light intensity measured by a color sensor may be inaccurate, such that the true color printed on the sheet of print media is not accurately determined by the color sensor. The present invention overcomes these disadvantages of the prior art by providing a spatially uniform output light beam 18 around the region of the anticipated reflection position 58, and/or a non-converging or a non-diverging output light beam 18 to the color region 36 to be measured. Use of a spatially uniform output light beam 18 in the region of the anticipated reflection position 58, and/or use of a non-converging or a non-diverging output light beam 18 may allow slight positional inaccuracy of a sheet of print media 34 with respect to an anticipated reflection position 58, without appreciably changing the light intensity measurement as measured by a color sensor 48.

Due to the spatially uniform, and/or non-converging and non-diverging nature of output light beam 18 in the region of the anticipated reflection position 58 that is transmitted to sheet of print media 34 on print media support 26, a color sensor 48 may detect or sense an accurate color measurement of printed color region 36 on sheet of print media 34 even if sheet of print media 34 is not accurately positioned in an anticipated reflection position 58, i.e., even if sheet 26 is not positioned on the plane of top surface 44 of print media support 26. In other words, so long as sheet of print media 34 is positioned within a range of focus 50 of color sensor 48, an accurate measurement of the color of printed color region 36 may be determined by color sensor 48. Range of focus 50 of color sensor 48 may be determined by low position 42 of print media 34 and high position 46 of print media 34 during a particular color sensing operation. Accordingly, spatially uniform, and/or non-converging or non-diverging output light beam 18 in the region of the anticipated reflection position 58 allows a sheet of print media 34 to be positioned anywhere within range of focus 50 and still provide an accurate color measurement by color sensor 48. In other words, device 10 enables color measurements to be made with a reduced sensitivity to height variations of a test sample when making color measurements. The illumination device 10 may be optimized for uniformity of the printed color region 36 as well as maintaining a relatively constant power into the printed color region 36 with vertical shifts of the sheet of print media 34 along axis 54.

Use of such a substantially height insensitive color measurement device 10 may be particularly useful for measuring printed color regions 36 on a variety of print media 34, such as paper, card stock, mylar, cardboard, fabric, and the like, which may each define a unique height of thickness.

Still referring to FIG. 1, device 10 may further include optical elements, such as lenses 64 and 66, that are positioned along a reflected light axis 54 of reflected light 52, wherein reflected light axis 54 may also be referred to as a sensor axis 54.

In the embodiment shown axis 54 of reflected light 52 may be positioned perpendicular to top surface 44 of print media support 26 and axis 32 of output light beam 18 may be positioned at an angle 60 of approximately forty-five degrees with respect to top surface 44 of print media support 26. Lenses 64 and 66 may be positioned and sized such that all reflected light 52 from printed color region 36 of sheet of print media 34 will be transmitted to color sensor 48 so long as top surface 38 of sheet of print media 34 is positioned within range of focus 50. In particular, when sheet of print media 34 is positioned on top surface 44 of print media support 26, reflected light axis 54a is centered within and extends through lenses 64 and 66. When sheet of print media 34 is positioned at high position 46, reflected light axis 54b is positioned within and extends through lenses 64 and 66. When sheet of print media 34 is positioned at low position 42, reflected light axis 54c is positioned within and extends through lenses 64 and 66. Accordingly, in all positions of sheet of print media 34 within range of focus 50, color sensor 48 will receive substantially a single intensity measurement of reflected light 52 along reflected light axis 54 such that an accurate color measurement of printed color region 36 may be determined with slight positional variations of the sample. Range of focus 50 may also be referred to as a reflection region and in one embodiment may define a length 62 of at least 2.5 mm, measured parallel to axis 54.

Other variations and modifications of the concepts described herein may be utilized and fall within the scope of the claims below.

We claim:

1. A color sensing apparatus (10), comprising:
   an optical system (16) that produces a spatially uniform light beam (18); and
   a color sensor (48) that senses reflected light (52) of a reflection of said spatially uniform light beam;
   wherein said optical system (16) is chosen from one of a hollow light pipe and a solid elongate member manufactured of a material having an index of refraction greater than air; and
   wherein said optical system (16) includes a tapered inlet surface (16a) that defines an acute angle with respect to an output light beam axis (32).

2. A color sensing apparatus (10), comprising:
   an optical system (16) that produces a spatially uniform light beam (18);
   a color sensor (48) that senses reflected light (52) of a reflection of said spatially uniform light beam;
   a lens (28) positioned between said optical system and a reflection region (58) of said spatially uniform light beam, wherein said optical system and said lens together produce said spatially uniform light beam, and wherein said lens projects said spatially uniform light beam to said reflection region while preventing said spatially uniform light beam from converging and from diverging during said projection; and
   a second lens (30), one of said lens (28) and said second lens (30) secured to an end (20) of said optical system and a. remaining one of said lens and said second lens spaced from said optical system and positioned between said optical element and said reflection region.

3. A method of making a color sensor (10), comprising:
   positioning a light integrator (16) adjacent a reflection region (58) such that light projected from said light integrator(18) will be reflected from said reflection region along a sensor axis (54);
   positioning a color sensor (48) along said sensor axis so as to receive light reflected from said reflection region; and
   securing a field lens (28) to an end (20) of said light integrator (16), said field lens transmitting said light projected from said light integrator to said reflection region, wherein said transmitting comprises transmitting non-diverging and non-converging light to said reflection region.

4. A method of making a color sensor (10), comprising:
   positioning a light integrator (16) adjacent a. reflection region (58) such that light projected from said light integrator(18) has an approximately constant power as a function of position and will he reflected from said reflection region along a sensor axis (54);
   positioning a color sensor (48) along said sensor axis so as to receive light reflected from said reflection region; and
   securing a field lens (28) to an end (20) of said light integrator (16), said field lens transmitting said light projected from said light integrator to said reflection region, wherein said transmitting comprises transmitting non-diverging and non-converging light to said reflection region.

* * * * *

UNITED STATES PATENT AND TRADEMARK OFFICE
CERTIFICATE OF CORRECTION

PATENT NO. : 8,390,810 B2
APPLICATION NO. : 12/746464
DATED : March 5, 2013
INVENTOR(S) : Stephan R. Clark et al.

It is certified that error appears in the above-identified patent and that said Letters Patent is hereby corrected as shown below:

In the Claims:

In column 5, line 30, in Claim 2, delete "a." and insert -- a --, therefor.

In column 6, line 17, in Claim 4, delete "a." and insert -- a --, therefor.

In column 6, line 20, in Claim 4, delete "he" and insert -- be --, therefor.

Signed and Sealed this
Sixth Day of August, 2013

Teresa Stanek Rea
*Acting Director of the United States Patent and Trademark Office*